United States Patent [19]
Weng

[11] Patent Number: 6,148,430
[45] Date of Patent: Nov. 14, 2000

[54] ENCODING APPARATUS FOR RAID-6 SYSTEM AND TAPE DRIVES

[75] Inventor: Lih-Jyh Weng, Shrewsbury, Mass.

[73] Assignee: Quantum Corporation, Milpitas, Calif.

[21] Appl. No.: 09/079,757

[22] Filed: May 15, 1998

[51] Int. Cl.[7] .......................... G11C 29/00; H03M 13/00
[52] U.S. Cl. .......................... 714/770; 714/771; 714/784; 714/785
[58] Field of Search ................................ 714/770, 769, 714/771, 784, 785, 6; 369/93; 360/53, 91, 98.01

[56] References Cited

U.S. PATENT DOCUMENTS

| | | | |
|---|---|---|---|
| 4,796,110 | 1/1989 | Glass et al. | 360/53 |
| 5,185,746 | 2/1993 | Tanaka et al. | 371/40.1 |
| 5,333,143 | 7/1994 | Blaum et al. | 371/40.4 |
| 5,499,253 | 3/1996 | Lary | 371/40.1 |
| 5,579,475 | 11/1996 | Blaum et al. | 395/182.05 |
| 5,822,336 | 10/1998 | Weng et al. | 371/37.11 |
| 5,889,794 | 3/1999 | Mo et al. | 371/37.11 |
| 5,901,158 | 5/1999 | Weng et al. | 371/37.12 |
| 5,948,117 | 9/1999 | Weng et al. | 714/784 |
| 5,978,956 | 11/1999 | Weng et al. | 714/784 |
| 6,044,389 | 3/2000 | Weng et al. | 708/492 |

FOREIGN PATENT DOCUMENTS 2 341 464   3/2000   United Kingdom ............ G06F 11/00

OTHER PUBLICATIONS

Weng et al., "Systematic modified Reed–Solomon codes", 1997 Global Telecommunications Conference, IEEE Globecom '97, vol. 3, pp. 1245–1249, Nov. 1997.

Primary Examiner—Albert De Cady
Assistant Examiner—Samuel Lin
Attorney, Agent, or Firm—Cesari & McKenna

[57] ABSTRACT

An encoding/decoding system for RAID-6 or multiple track tape systems uses one of a selected set of values for m, with m+1 prime and the field $GF(2^m)$ generated by the irreducible polynomial:

$$g(x) = x^m + x^{m-1} + \ldots + x^2 + x + 1.$$

The system performs Galois Field multiplication operations as a combination of cyclic shifting and exclusive-OR operations, and determines multiplicative inverses of weight one, two and three (m+1)-bit symbols by raising various (m+1)-bit symbols to selected powers of two. Using this system, the value of m may be chosen to be as large as or larger than the sector or tape block, and the encoding and decoding is performed once per sector or block.

14 Claims, 8 Drawing Sheets

Table 1: Values of m for GF ($2^m$) with irreducible polynomial
$x^m + x^{m-1} + x^{m-2} + ... + x^3 + x^2 + x + 1$:

| | | | | | | | | | |
|---|---|---|---|---|---|---|---|---|---|
| 2 | 4 | 10 | 12 | 18 | 28 | 36 | 52 | 58 | 60 |
| 66 | 82 | 100 | 106 | 130 | 138 | 148 | 162 | 172 | 178 |
| 180 | 196 | 210 | 226 | 268 | 292 | 316 | 346 | 348 | 372 |
| 378 | 388 | 418 | 420 | 442 | 460 | 466 | 490 | 508 | 522 |
| 540 | 546 | 556 | 562 | 586 | 612 | 618 | 652 | 658 | 660 |
| 676 | 700 | 708 | 756 | 772 | 786 | 796 | 820 | 826 | 828 |
| 852 | 858 | 876 | 882 | 906 | 940 | 946 | 1018 | 1060 | 1090 |
| 1108 | 1116 | 1122 | 1170 | 1186 | 1212 | 1228 | 1236 | 1258 | 1276 |
| 1282 | 1290 | 1300 | 1306 | 1372 | 1380 | 1426 | 1450 | 1452 | 1482 |
| 1492 | 1498 | 1522 | 1530 | 1548 | 1570 | 1618 | 1620 | 1636 | 1666 |
| 1668 | 1692 | 1732 | 1740 | 1746 | 1786 | 1860 | 1866 | 1876 | 1900 |
| 1906 | 1930 | 1948 | 1972 | 1978 | 1986 | 1996 | 2026 | 2028 | 2052 |
| 2068 | 2082 | 2098 | 2130 | 2140 | 2212 | 2220 | 2236 | 2242 | 2266 |
| 2268 | 2292 | 2308 | 2332 | 2338 | 2356 | 2370 | 2388 | 2436 | 2458 |
| 2466 | 2476 | 2530 | 2538 | 2548 | 2556 | 2578 | 2620 | 2658 | 2676 |
| 2682 | 2692 | 2698 | 2706 | 2740 | 2788 | 2796 | 2802 | 2818 | 2836 |
| 2842 | 2850 | 2860 | 2908 | 2938 | 2956 | 2962 | 3010 | 3018 | 3036 |
| 3066 | 3082 | 3186 | 3202 | 3252 | 3298 | 3306 | 3322 | 3346 | 3370 |
| 3412 | 3460 | 3466 | 3468 | 3490 | 3498 | 3516 | 3532 | 3538 | 3546 |
| 3556 | 3570 | 3580 | 3612 | 3636 | 3642 | 3658 | 3676 | 3690 | 3700 |
| 3708 | 3732 | 3778 | 3796 | 3802 | 3850 | 3852 | 3876 | 3906 | 3916 |
| 3922 | 3930 | 3946 | 3988 | 4002 | 4012 | 4018 | 4020 | 4090 | 4092 |
| 4098 | 4132 | 4138 | 4156 | 4218 | 4228 | 4242 | 4252 | 4258 | 4260 |
| 4282 | 4348 | 4356 | 4362 | 4372 | 4396 | 4450 | 4482 | 4492 | 4506 |
| 4516 | 4546 | 4602 | 4620 | 4636 | 4690 | 4722 | 4786 | 4788 | 4812 |
| 4876 | 4932 | 4956 | 4972 | 4986 | 5002 | 5010 | 5050 | 5058 | 5076 |
| 5098 | 5106 | 5146 | 5170 | 5178 | 5188 | 5226 | 5260 | 5308 | 5332 |
| 5386 | 5442 | 5476 | 5482 | 5500 | 5506 | 5556 | 5562 | 5572 | 5650 |
| 5658 | 5682 | 5692 | 5700 | 5716 | 5740 | 5748 | 5778 | 5812 | 5826 |
| 5842 | 5850 | 5868 | 5922 | 5938 | 5986 | 6010 | 6028 | 6052 | 6066 |
| 6100 | 6130 | 6172 | 6196 | 6202 | 6210 | 6228 | 6268 | 6276 | 6298 |
| 6316 | 6322 | 6372 | 6378 | 6388 | 6396 | 6468 | 6490 | 6546 | 6618 |
| 6636 | 6652 | 6658 | 6690 | 6700 | 6708 | 6732 | 6762 | 6778 | 6780 |
| 6802 | 6826 | 6828 | 6868 | 6882 | 6898 | 6906 | 6916 | 6946 | 6948 |
| 6970 | 7012 | 7018 | 7026 | 7042 | 7068 | 7108 | 7186 | 7210 | 7218 |
| 7228 | 7236 | 7242 | 7252 | 7282 | 7306 | 7330 | 7348 | 7410 | 7450 |
| 7458 | 7476 | 7498 | 7506 | 7516 | 7522 | 7540 | 7546 | 7548 | 7572 |
| 7588 | 7602 | 7620 | 7642 | 7668 | 7690 | 7716 | 7756 | 7788 | 7828 |
| 7852 | 7876 | 7882 | 7900 | 7906 | 7932 | 7948 | 8052 | 8068 | 8092 |
| 8116 | 8122 | 8146 | 8170 | 8178 | 8218 | 8220 | 8236 | 8242 | 8268 |
| 8290 | 8292 | 8362 | 8386 | 8428 | 8442 | 8466 | 8538 | 8562 | 8572 |
| 8596 | 8626 | 8668 | 8676 | 8692 | 8698 | 8730 | 8740 | 8746 | 8802 |

*Fig. 1A*

| | | | | | | | | |
|---|---|---|---|---|---|---|---|---|
| 8818 | 8820 | 8836 | 8860 | 8866 | 8922 | 8932 | 8962 | 8970 | 9010 |
| 9028 | 9058 | 9172 | 9180 | 9202 | 9220 | 9226 | 9282 | 9292 | 9322 |
| 9340 | 9348 | 9370 | 9396 | 9418 | 9420 | 9436 | 9466 | 9490 | 9532 |
| 9538 | 9546 | 9586 | 9612 | 9618 | 9628 | 9642 | 9660 | 9676 | 9732 |
| 9748 | 9802 | 9850 | 9858 | 9882 | 9900 | 9906 | 9922 | 9940 | 9948 |
| 10036 | 10066 | 10068 | 10090 | 10092 | 10098 | 10132 | 10138 | 10140 | 10162 |
| 10180 | 10252 | 10258 | 10266 | 10300 | 10330 | 10356 | 10426 | 10458 | 10476 |
| 10498 | 10500 | 10588 | 10612 | 10666 | 10690 | 10708 | 10722 | 10732 | 10788 |
| 10836 | 10852 | 10858 | 10860 | 10866 | 10882 | 10890 | 10908 | 10948 | 10972 |
| 10978 | 10986 | 11002 | 11026 | 11068 | 11082 | 11092 | 11130 | 11170 | 11196 |
| 11212 | 11260 | 11316 | 11436 | 11442 | 11482 | 11548 | 11578 | 11586 | 11620 |
| 11676 | 11698 | 11716 | 11778 | 11788 | 11812 | 11820 | 11826 | 11866 | 11908 |
| 11932 | 11938 | 11980 | 11986 | 12010 | 12042 | 12106 | 12148 | 12156 | 12196 |
| 12202 | 12210 | 12226 | 12250 | 12252 | 12268 | 12276 | 12300 | 12322 | 12346 |
| 12372 | 12378 | 12412 | 12436 | 12490 | 12538 | 12546 | 12588 | 12610 | 12612 |
| 12618 | 12636 | 12652 | 12658 | 12738 | 12756 | 12762 | 12780 | 12820 | 12828 |
| 12898 | 12906 | 12916 | 12922 | 12940 | 12978 | 13036 | 13042 | 13108 | 13146 |
| 13162 | 13186 | 13228 | 13290 | 13330 | 13338 | 13396 | 13410 | 13450 | 13468 |
| 13476 | 13522 | 13612 | 13618 | 13626 | 13690 | 13708 | 13722 | 13756 | 13762 |
| 13828 | 13858 | 13876 | 13882 | 13900 | 13906 | 13930 | 13932 | 13996 | 14010 |
| 14050 | 14106 | 14172 | 14220 | 14242 | 14340 | 14386 | 14388 | 14410 | 14418 |
| 14460 | 14532 | 14548 | 14556 | 14620 | 14626 | 14628 | 14652 | 14668 | 14698 |
| 14716 | 14722 | 14740 | 14746 | 14770 | 14796 | 14812 | 14820 | 14826 | 14842 |
| 14850 | 14866 | 14868 | 14890 | 14922 | 14938 | 14946 | 14956 | 15012 | 15052 |
| 15060 | 15076 | 15082 | 15090 | 15100 | 15106 | 15130 | 15138 | 15148 | 15172 |
| 15186 | 15226 | 15258 | 15268 | 15298 | 15330 | 15348 | 15372 | 15412 | 15426 |
| 15442 | 15460 | 15580 | 15628 | 15660 | 15666 | 15682 | 15730 | 15738 | 15748 |
| 15772 | 15786 | 15796 | 15802 | 15858 | 15906 | 15922 | 15970 | 16066 | 16068 |
| 16138 | 16186 | 16188 | 16228 | 16252 | 16300 | 16332 | 16338 | 16348 | 16362 |
| 16380 | 16420 | 16426 | 16452 | 16476 | 16492 | 16546 | 16572 | 16602 | 16618 |
| 16650 | 16692 | 16746 | 16762 | 16786 | 16828 | 16842 | 16882 | 16900 | 16930 |
| 16962 | 16978 | 16980 | 17010 | 17020 | 17026 | 17052 | 17076 | 17092 | 17098 |
| 17122 | 17188 | 17202 | 17298 | 17316 | 17332 | 17386 | 17388 | 17442 | 17476 |
| 17482 | 17508 | 17572 | 17578 | 17596 | 17626 | 17668 | 17746 | 17748 | 17788 |
| 17826 | 17836 | 17850 | 17890 | 17908 | 17922 | 17938 | 17956 | 17980 | 17988 |
| 18012 | 18042 | 18058 | 18076 | 18148 | 18180 | 18228 | 18250 | 18268 | 18412 |
| 18426 | 18442 | 18460 | 18492 | 18586 | 18636 | 18700 | 18730 | 18748 | 18756 |
| 18772 | 18786 | 18858 | 18868 | 18898 | 18916 | 18946 | 18972 | 18978 | 19012 |
| 19036 | 19050 | 19068 | 19138 | 19140 | 19156 | 19162 | 19180 | 19218 | 19236 |
| 19258 | 19300 | 19332 | 19372 | 19378 | 19386 | 19402 | 19426 | 19468 | 19482 |
| 19500 | 19506 | 19540 | 19570 | 19596 | 19602 | 19660 | 19708 | 19716 | 19738 |
| 19762 | 19812 | 19852 | 19866 | 19890 | 19948 | 19962 | 19972 | 19978 | 19996 |
| 20028 | 20050 | 20106 | 20116 | 20122 | 20148 | 20172 | 20218 | 20260 | 20268 |
| 20322 | 20340 | 20356 | 20442 | 20476 | 20506 | 20508 | 20532 | 20548 | 20610 |
| 20626 | 20692 | 20716 | 20730 | 20748 | 20770 | 20772 | 20788 | 20898 | 20938 |
| 20962 | 20980 | 21010 | 21012 | 21018 | 21058 | 21066 | 21100 | 21106 | 21138 |

ENCODING APPARATUS FOR RAID-6 SYSTEM AND TAPE DRIVES

BACKGROUND OF THE INVENTION

Systems with multiple, independent disks that use more than one of the disks for storing redundant data are commonly referred to as RAID-6 systems, where RAID is an acronym for "redundant array of inexpensive or independent disks." In a system with "k" data disks and "e" redundant disks, the data recorded on the r redundant disks are produced by manipulating the data recorded on the k data disks. Typically, the data on the r redundant disks is the result of error correction encoding of the data on the k data disks.

The data on the k data disks is in the form of data code words that each include data symbols and associated error correction code (ECC) symbols. The ECC symbols are produced by encoding the data symbols in a conventional manner in accordance with an ECC. The sectors on the r redundant disks contain redundant codewords. The symbols is in these codewords are produced by encoding the corresponding symbols from each of the k data disks. The encoding can be thought of as encoding down a "column" of k corresponding symbols. To avoid confusion herein, the ECC used to encode the column of k symbols is referred to as the "column ECC." Typically, the column ECC is not the same as the ECC used to produce the data codewords for the k data disks.

The symbols stored on the r redundant disks are used to correct errors in the data codewords that cannot be corrected using the ECC symbols included therein. To correct an error, the system decodes the column that contains the erroneous data symbol in accordance with the column ECC.

To produce the data for the redundant disks, the system segments the data stored in the k corresponding sectors into m-bit symbols. The system then encodes the corresponding m-bit symbols from each of the k sectors in accordance with the column ECC, to produce r corresponding m-bit redundancy symbols. These r symbols are recorded, respectively, in the corresponding sector on each of the r redundant disks.

To minimize the time required to encode and decode the columns, the system designer would like to choose a symbol size, that is, a value for "m", that is relatively large. This reduces the number of column encoding/decoding operations required per sector. The encoding and decoding operations require a plurality of Galois Field multiplication operations. In the conventional systems, the complexity of the Galois Field multiplication operations increases significantly as the size of m increases. Further, each decoding operation includes determining the multiplicative inverses of elements of the Galois Field GF ($2^m$). For large m, the operation of finding multiplicative inverses is time consuming and/or it may require a large, $2^m-1$ element, look-up table. Accordingly, the value of m is selected as a compromise between system complexity and overall time to encode/decode.

The tracks of multiple track tape systems may be used in the same way that the multiple disks are used in the RAID-6 systems. Thus, data code words are stored on k tracks and the associated redundancy symbols are stored on the remaining r tracks. The same encoding/decoding techniques that are used for the k+r disks are used for the k+r tracks. Accordingly, the same compromise is made in selecting the size of the m-bit symbols for the column encoding.

SUMMARY OF THE INVENTION

The invention is an encoding/decoding system for RAID-6 or multiple track tape systems that uses one of a selected set of values for m and performs Galois Field multiplication operations as a combination of cyclic shifting and exclusive-OR operations. The system also determines certain multiplicative inverse operations essentially by raising various elements of the field to selected powers of two, as discussed in more detail below. Using this system, the value of m may be chosen to be arbitrarily large, without increasing the complexity of the multiplication or inverse operations performed by the system.

The system performs multiplication and inverse operations using (m+1)-bit symbols, where m+1 is prime. The value of m is selected such that the field GF($2^m$) can be generated by the irreducible polynomial:

$$g(x) = x^m + x^{m-1} + \ldots + x^2 + x + 1.$$

Multiplication of two elements a(x) and b(x) of GF($2^m$) can be performed by exclusive OR'ing cyclically shifted (m+1)-bit versions of the element b(x). Further, as discussed below, the multiplicative inverse of an element c(x) of GF($2^m$) with weight 1, 2 or 3, can be readily determined using the (m+1)-bit representations, essentially by raising particular elements of the field to associated powers of two. Accordingly, decoding operations are less complex and/or less time consuming than those of known prior systems.

Using this system, the value of m may be selected to be as large as, for example, a sector of the disk or a block of the tape. In this way, the column error correction encoding/decoding can be performed once per sector or block.

BRIEF DESCRIPTION OF THE DRAWINGS

The invention description below refers to the accompanying drawings, of which:

FIGS. 1A–1C together are a table of selected values of m;

DETAILED DESCRIPTION OF AN ILLUSTRATIVE EMBODIMENT

We discuss the invention herein in terms of a multiple-disk system, with k data disks and r redundant disks. The invention can also be used with multiple track tape systems, with k data tracks and r redundant tracks.

In a conventional RAID-6 system the r redundancy symbols associated with the $i^{th}$ m-bit symbol in each of the k sectors, that is, with the $i^{th}$ column, are typically produced as:

$$c_0 = i_0 + i_1 + i_2 + \ldots + i_{k-1}$$

$$c_1 = (\alpha^{1*0})*i_0 + (\alpha^{1*1})*i_1 + (\alpha^{1*2})*i_2 + \ldots + (\alpha^{1*(k-1)})*i_{k-1}$$

$$c_2 = (\alpha^{2*0})*i_0 + (\alpha^{2*2})*i_2 + \ldots + (\alpha^{2*(k-1)})*i_{k-1}$$

$$c_{(r-1)} = (\alpha^{(r-1)*0})*i_0 + (\alpha^{(r-1)*1})*i_1 + (\alpha^{(r-1)*2})*i_2 + \ldots + (\alpha^{(r-1)*(k-1)})*i_{k-1}$$

where $c_{(r-1)i}$ is the redundant symbol for the $i^{th}$ column on the $r^{th}$ redundant disk, $i_j$ is the symbol stored in the $i^{th}$ column on the $j^{th}$ disk, "+" and "*" represent Galois Field addition and multiplication, and "$\alpha$" is an element of GF($2^m$). There are thus a plurality of time consuming Galois Field multiplication operations that must be performed to produce the redundancy symbols for each column.

The inventive system uses one of a selected number of fields GF($2^m$) and simplifies the Galois Field multiplication operations. For the selected m, with m+1 prime, the Galois Field GF($2^m$) can be generated by the irreducible polynomial:

$$g(x) = x^m + x^{m-1} + \ldots + x^2 + x + 1,$$

and the element 2 is a primitive element of the field GF(m+1). Such fields are discussed in paper by J. K. Wolf entitled, "Efficient Circuits For Multiplying In GF($2^m$) For Certain Values of m", published in *Discrete Mathematics* 106/107 (1992) pp. 497–502 which is incorporated herein by reference. As discussed below, the system makes use of these fields, and does not require that the primitive element of GF($2^m$) is known. This is important when a larger field is used, since the primitive element may be difficult to determine. The values of m, for m<32987 are listed in Table 1 of FIG. 1.

As discussed in a co-pending U.S. patent application Ser. No. 08/786,894 entitled MODIFIED REED-SOLOMON ERROR CORRECTION SYSTEM USING (w+i+1)-bit REPRESENTATIONS OF SYMBOLS OF GF($2^{w+i}$) the elements of GF($2^m$) can be represented by two (m+1)-bit symbols a(x) and b(x) that are complements. Thus, a(x)+b(x)=0. For example, an element of GF($2^4$) can be represented by either of two 5-bit symbols:

| element | 4-bit representation | 5-bit representation |
| --- | --- | --- |
| 0 | 0000 | 00000 or 11111 |
| $\beta^0$ | 0001 | 00001 or 11110 |
| $\beta^1$ | 0011 | 00011 or 11100 |
| $\beta^2$ | 0101 | 00101 or 11010 |
| $\beta^3$ | 1111 | 01111 or 10000 |
| ... | ... | ... |
| $\beta^{14}$ | 1010 | 01010 or 10101 |

The (m+1)-bit representations of the m-bit symbols are produced by either appending a leading zero, or by appending a leading 1 and complementing the remaining m bits. It is clear that one of the (m+1)-bit representations has a smaller weight, that is, number of ones, than the other (m+1)-bit representation.

Multiplication of two (m+1)-bit symbols can be performed by exclusive-OR'ing cyclically shifted copies of one of the symbols with the coefficients, or bits, of the other symbol. Using elements of GF($2^4$) as an example, the multiplication of the two elements a(x) and b(x), that is, a(x)*b(x) where a(x)=$a_4 a_3 a_2 a_1 a_0$ $$b(x) = b_4 b_3 b_2 b_1 b_0$$

is calculated as:

$b_0$*($a_4 a_3 a_2 a_1 a_0$)
+$b_1$*($a_3 a_2 a_1 a_0 a_4$)
+$b_2$*($a_2 a_1 a_0 a_4 a_3$)
+$b_3$*($a_1 a_0 a_4 a_3 a_2$)
+$b_4$*($a_0 a_4 a_3 a_2 a_1$)

If a coefficient of b(x) is a zero, the product of that coefficient and a cyclically shifted version of a(x) is zero, and thus, need not be calculated. Accordingly, the multiplication can be simplified by selecting the lower weight of the two (m+1)-bit representations for b(x). Indeed, the multiplication can be further simplified by selecting b(x) as the lower weight of the two symbols. For b(x)=00101, for example, the multiplication of a(x)* b(x)=($a_4 a_3 a_2 a_1 a_0$)+($a_2 a_1 a_0 a_4 a_3$). The simplest multiplication operation involves an (m+1)-bit symbol b(x) that has a single coefficient of 1 and m zero-valued coefficients. The product is then a cyclically-shifted version of the (m+1)-bit representation of a(x).

The multiplication operation does not increase in complexity as the size of m increases. Accordingly, m can be selected to be at least as large as, for example, the number of bits in a sector. This means that a single column encoding operation is performed per sector.

1. Encoding

As discussed above, in a conventional RAID-6 system the r redundancy symbols associated with the $i^{th}$ m-bit symbol in each of the k sectors, that is, with the $i^{th}$ column, are typically produced as:

$$c_{y,i} = (\alpha^{y*0}) * i_0 + (\alpha^{y*1}) * i_1 + (\alpha^{y*2}) * i_2 + \ldots + (\alpha^{y*(k-1)}) * i_{k-1}$$

for y=0, 1 . . . , r−1.

The current system preferably uses a value of m that is at least as large as the number of bits in the disk sector. Then, a single encoding operation produces the sector-sized symbols for the corresponding sectors on the redundancy disks. The element $\alpha$ is selected as 00000 . . . 10, which has m−1 leading zeros. If the number of redundancy disks is less than or equal to m+1, the powers of $\alpha$ required in the set of equations for the redundancy symbols are:

$$\alpha^0 = 000 \ldots 01$$

$$\alpha^1 = 000 \ldots 10$$

$$\alpha^2 = 000 \ldots 100$$

$$\vdots$$

$$\alpha^m = 100 \ldots 00.$$

and the multiplication operations are cyclic shifts.

Figure 2:
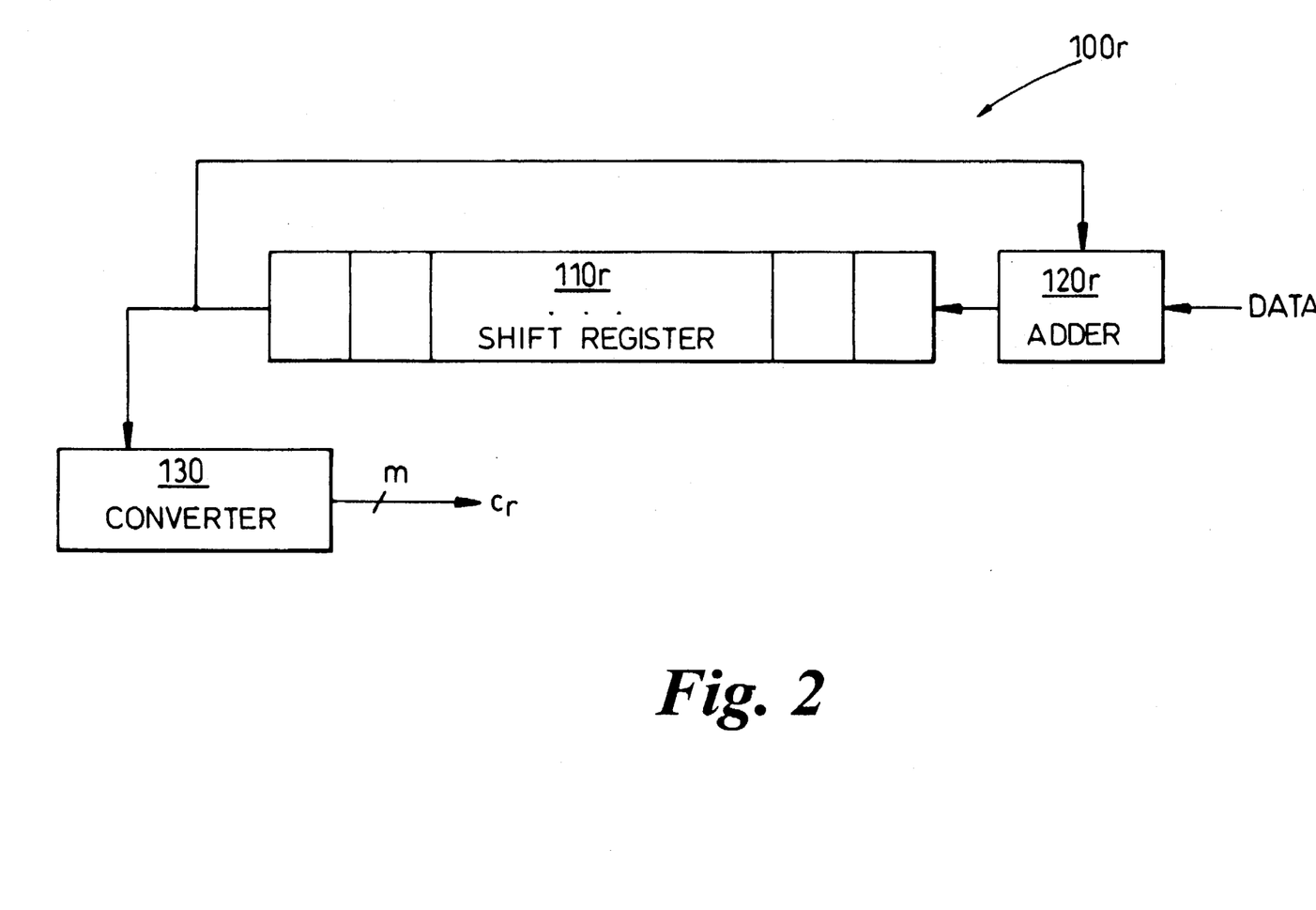
FIG. 2 is a functional block diagram of a circuit for producing redundancy symbols $c_r$.

Referring now to FIG. 2, the $k^{th}$ product in the equation for $c_r$ is calculated in circuit $100_r$ by feeding the (m+1)-bit representation of the data from the corresponding sector on the $k^{th}$ disk into an (m+1)-bit shift register $110r$ and cyclically shifting the symbol to the left by "j" bits, where j=r−1, r−2 . . . 1, 0. The product is next added in adder $120r$ to the data from the corresponding symbol of the $(k-1)^{st}$ disk. The shift register is again shifted by j bits and the data from the corresponding sector on the $(k-2)^{nd}$ disk is added to the contents of the shift register, and so forth, to produce an (m+1)-bit representation of $c_r$.

Figure 3:
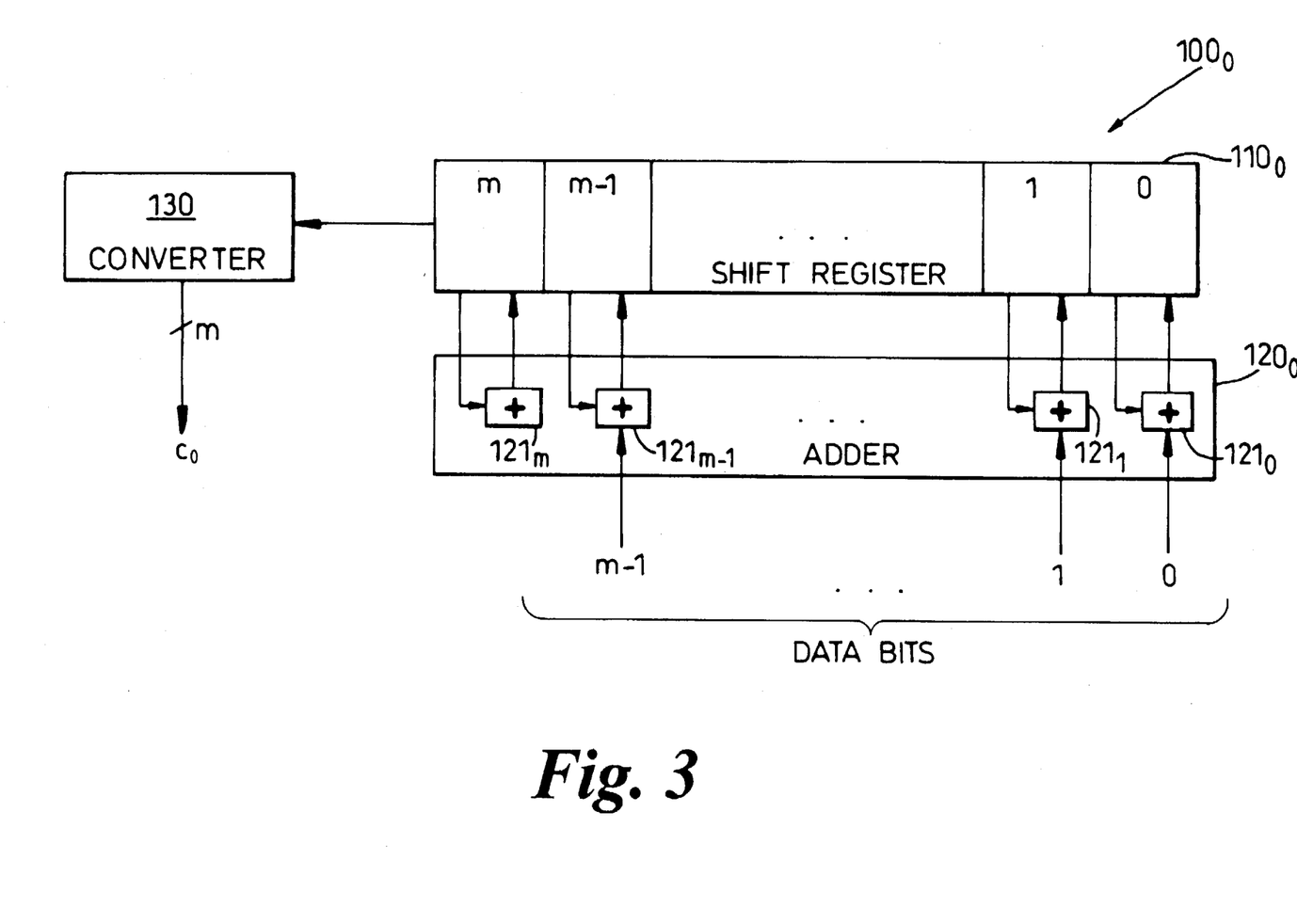
FIG. 3 is a functional block diagram of a circuit for producing a redundancy symbol $c_0$.

The circuit $100_0$ that produces $c_0 = i_0 + (\alpha^{0*1}) i_1 + (\alpha^{0*2}) i_2 + \ldots + (\alpha^{0*(k-1)}) i_{k-1}$ is shown in more detail in FIG. 3. The (m+1)-bit representation of the data from the sector on the $k^{th}$ disk is fed into the shift register $110_0$, and the shift register is shifted j=0 bits. The (m+1)-bit representation of the sector information on the $(k-1)^{st}$ disk is added to the contents of the shift register in adder $120_r$, which includes adder sub-circuits $121_o$–$121_m$ that combine the respective bits, and the shift register then contains:

$$(\alpha^{0*1}) * i_{k-1} + i_{k-2}$$

The shift register is again shifted j=0 bits and the (m+1)-bit representation of the data from the corresponding sector on the $(k-2)^{nd}$ disk is then added to the contents of the shift register. The shift register then contains:

$$\alpha^0((\alpha^{0*1})i_{k-1}+i_{k-2})+i_{k-3}$$

or $$(\alpha^{0*2})i_{k-1}+(\alpha^0)i_{k-2}+i_{k-3}$$

The shift register is again shifted j=0 bits and the (m+1)-bit representation of the data in the corresponding sector of the $(k-3)^{rd}$ disk is added to the contents of the shift register. The register then contains:

$$\alpha^0((\alpha^{0*2})i_{k-1}+(\alpha^{0*1})i_{k-2}+i_{k-3})+i_{k-4}$$

or $$(\alpha^{0*3})i_{k-1}+(\alpha^{0*2})i_{k-2}+(\alpha^0)i_{k-3}+i_{k-4}$$

and so forth until the data from corresponding sectors on the remaining data disks have been added into the shift register. The register then contains the (m+1)-bit redundancy symbol $c_0$.

The (m+1)-bit representation of the redundancy symbol $c_0$ is then converted to an m-bit symbol in a converter 130. The converter 130 exclusive-OR's the leading bit of the (m+1)-bit representation with each of the remaining m bits. If the leading bit is a zero the remaining m bits are unchanged, and the operation produces the same result as ignoring the leading bit. If the leading bit is a one the exclusive-OR operation complements the m bits, and the leading bit is then ignored.

The (m+1)-bit representations of the sector data are the contents of the sectors with a leading zero bit appended. Accordingly, the m bits read from the sector can be applied directly to the appropriate locations of the shift register, without a separate step of converting the m bits to the (m+1)-bit representation.

Figure 4:
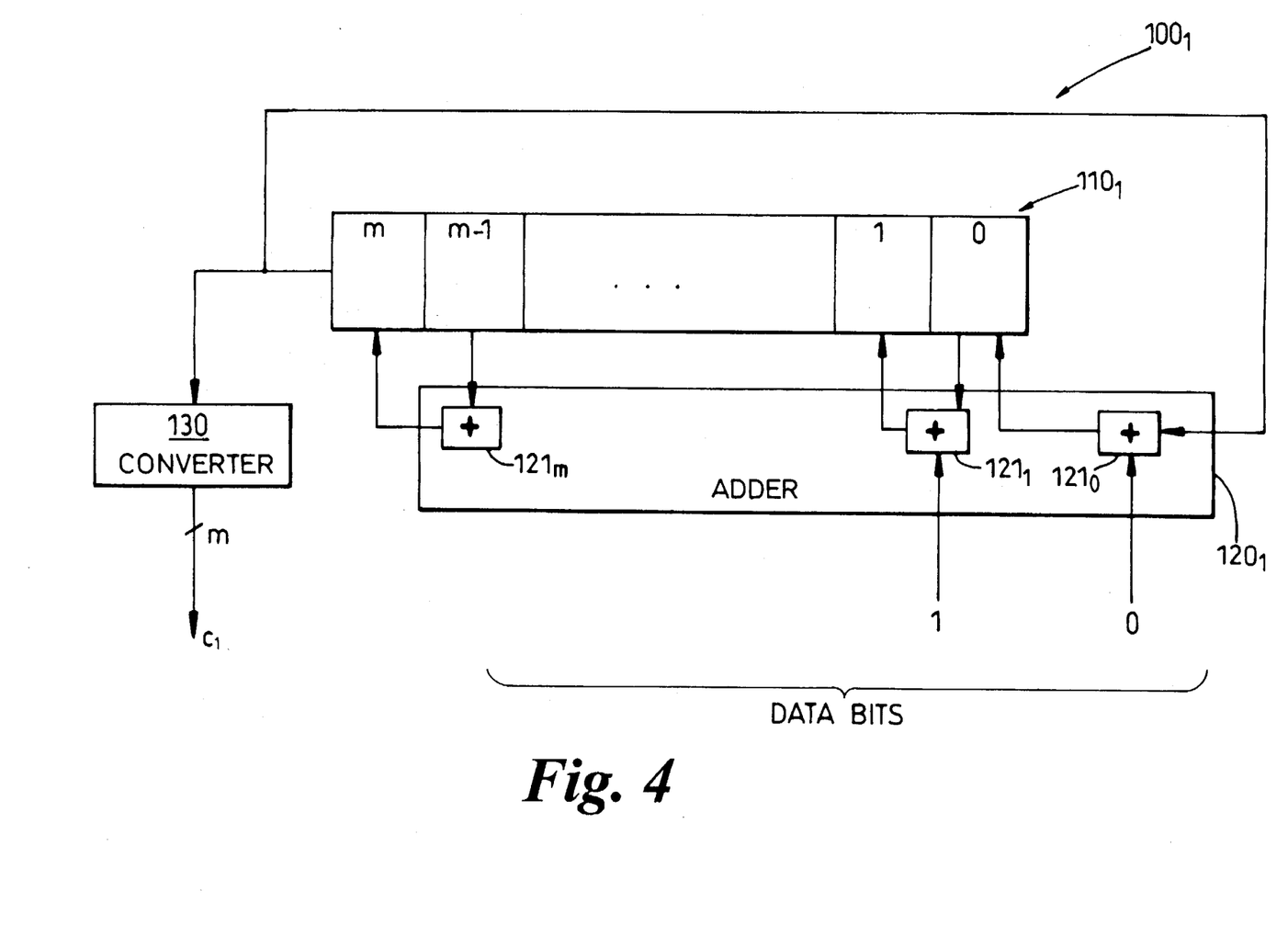
FIG. 4 is a functional block diagram of a circuit for producing a redundancy symbol $c_1$.

As depicted in FIG. 4, the circuit 100$_1$ for producing $c_1$ similarly includes a shift register 110$_1$ and an adder 120$_1$. The data from the sector on the $k^{th}$ data disk is applied to the shift register, the register is shifted j=1 bit and the data from the corresponding sector on the $(k-1)^{st}$ disk is added to the contents of the shift register. The bit 0 of the $(k-1)^{st}$ symbol combines with bit m of the $k^{th}$ symbol, bit 1 of the $(k-1)^{st}$ symbol combines with bit 0 of the $k^{th}$ symbol, and so forth, to produce:

$$\alpha^j i_{k-1}+i_{k-2}$$

The contents of the shift register 110$_1$ are then shifted j=1 bits and the data from the corresponding sector of the $(k-2)^{nd}$ data disk is added to the contents of the shift register to produce:

$$\alpha^j(\alpha^j i_{k-1}+i^{k-2})+i_{k-3}$$

or $$(\alpha^{j*2})i_{k-1}+(\alpha^{j*1})i_{k-2}+i_{k-3}$$

and so forth. After the data from all of the k disks are added into the shift register, the contents are applied to the converter 130. The converter converts the (m+1)-bit symbol into the m-bit symbol $c_1$.

The shift register 110$_j$ for j>1 may have its feedback path set up to perform the j-bit shift in a single clock cycle. In this way, a single shift operation performs the appropriate bit manipulation to multiply the shift register contents by $\alpha^j$. Thus, the redundancy symbols $c_0 \ldots c_{r-1}$ can be produced in parallel, in the same number of clock cycles.

Figure 5:
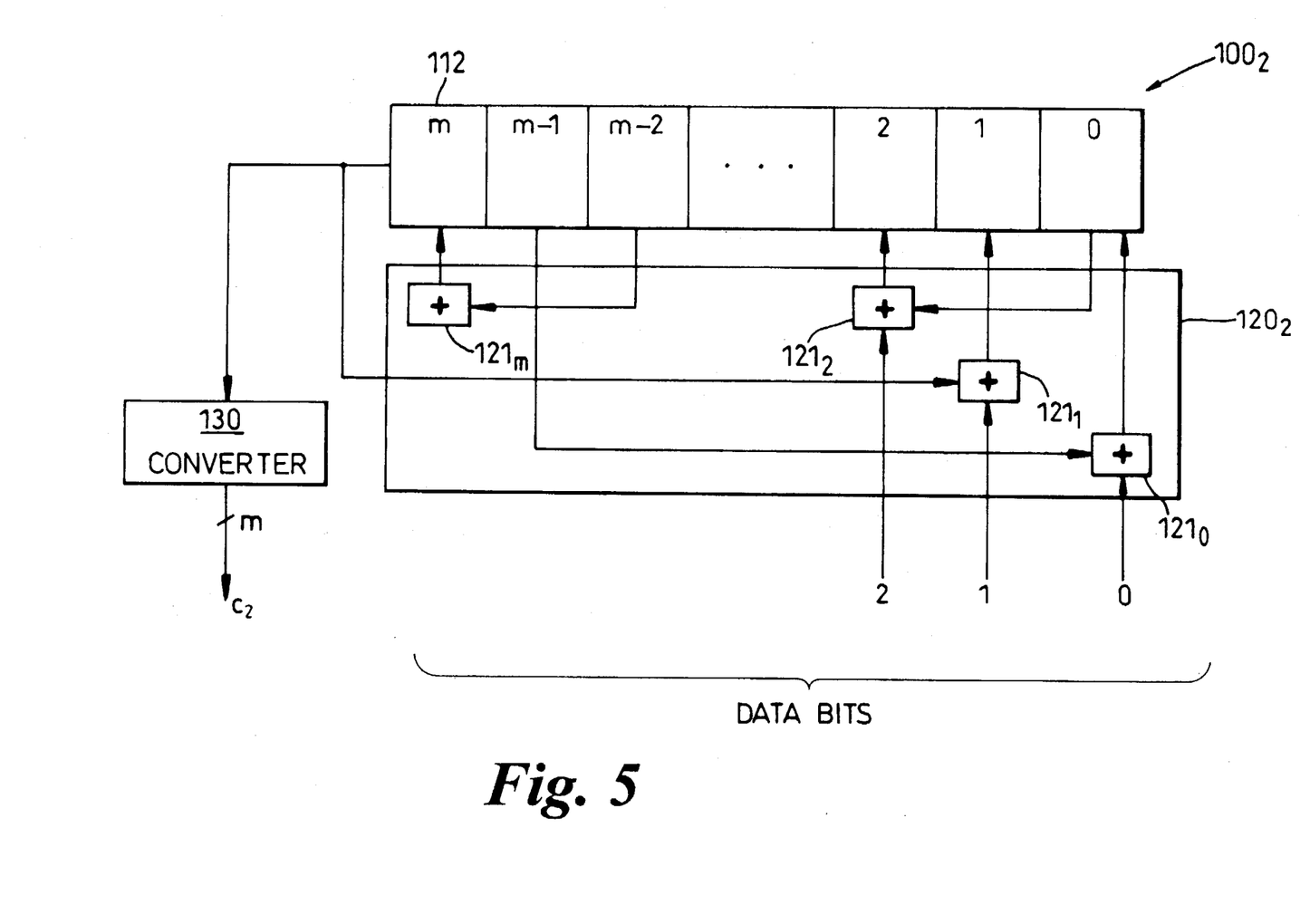
FIG. 5 is a functional block diagram of a preferred circuit for producing a redundancy symbol $c_2$.

Referring now to FIG. 5, the circuit for producing $c_2$ includes a shift register 110$_2$ with the feedback path arranged to produce in one clock cycle the results of a 2-bit cyclic shift. The shift register 110$_2$ feeds the bit m, from the location 112$_m$ to the location 112$_1$, the bit m−1 in the location 112$_{m-1}$ to the location 112$_0$, and the remaining bits m−2, … 0, respectively, from locations 112$_{m-2}$, … 112$_0$ to locations 112$_m$, …, 112$_2$. The bits from the corresponding sector on the $(k-1)^{st}$ disk are then added to the contents of the shift register, such that bit 0 of the $(k-1)^{st}$ sector combines with bit m−1 of the $k^{th}$ sector, bit 1 of the $(k-1)^{st}$ sector combines with bit m of the $k^{th}$ sector, bit 2 of the $(k-1)^{st}$ sector combines with bit 0 of the $k^{th}$ sector and so forth. The shift register then contains $$\alpha^j i_{k-1}+i_{k-2}$$

where j=2. The contents of the shift register are then fed back appropriately to multiply the contents by $\alpha^j$, which is the same as cyclically shifting the (m+1)-bit contents to the left by j bits. Also, the data from the corresponding sector of the $(k-2)^{nd}$ data disk are added into the register, and so forth, until the data from the corresponding sector of every data disk are added into the register. The contents of the shift register are then applied to the converter 130, which produces the m-bit redundancy symbol $c_2$.

The circuits for $C_3, C_4, \ldots, c_r$ are preferably similarly constructed with feedback paths that produce the appropriate j-bit shifts in a single clock cycle, as discussed above.

2. Decoding

As discussed, the system corrects errors that are detected, but can not be corrected, using the ECC symbols in the data code words. Accordingly, the error locations are known. As discussed in more detail below with reference to FIG. 6, correcting single or multiple errors using the current system generally involves finding the inverses of elements with weight 1, 2 or 3.

A $GF(2^m)$ element with weight 1, that is, an element with a single non-zero coefficient corresponds to (m+1)-bit representations that contain either a single one and m zeros, or a single zero and m ones. For an element $\alpha^i$=000 … 01 . . . 00 which has its single coefficient of 1 at the $i^{th}$ bit, the multiplicative inverse $\alpha^{-i}$ is the element that when multiplied by $\alpha^i$ produces $\alpha^0$=1.

The symbol $\alpha^0$ is the same as the (m+1)-bit symbol $\alpha^{m+1}$. Using the (m+1)-bit representations, the multiplicative inverse of $\alpha^i$ is the element that cyclically shifts the $i^{th}$ coefficient of $\alpha^i$ to the (m+1)$^{st}$ position. The inverse is thus $\alpha^{m+1-i}$. For m=4, the symbol $\alpha^2$=00100 has a multiplicative inverse of $\alpha^{5-2}=\alpha^3$. Thus, $\alpha^2 * \alpha^3 = \alpha^5 = \alpha^0$. Multiplying $\alpha^2$ by $\alpha^3$ is accomplished by a cyclic shift of 3 bits to the left.

For elements of weight two, that is, with two coefficients that are 1s and m−1 coefficients that are 0s, the multiplicative inverse is determined from the inverse of $$0000 \ldots 0011 = \alpha^1 + \alpha^0$$

The multiplicative inverse of this symbol is the symbol 0101 . . . 1010:

$$0000 \ldots 0011 * 0101 \ldots 1010 =$$
$$0101 \ldots 1010 + 1010 \ldots 0100 =$$
$$1111 \ldots 1110 \text{ or } 0000 \ldots 0001.$$

The inverse is thus the symbol $\alpha^{m-1}+\alpha^{m-3}+\alpha^{m-5}+\ldots+\alpha^3+\alpha^1$ and defining this symbol as $\delta$ we have $$\delta*(\alpha^1+\alpha^0)=\alpha^0$$

Raising the sum $\alpha^1+\alpha^0$ to powers of two produces $$(\alpha^1\alpha^0)^{2^0}=\alpha^{2^0}+\alpha^0=\alpha^1+\alpha^0$$
$$(\alpha^1+\alpha^0)^{2^1}=\alpha^{2^1}+\alpha^0=\alpha^2+\alpha^0$$
$$(\alpha^1+\alpha^0)^{2^2}=\alpha^{2^2}+\alpha^0=\alpha^4+\alpha^0$$
$$(\alpha^1+\alpha^0)^{2^m}=\alpha^{2^m}+\alpha^0=\alpha^{2^m}+\alpha^0$$

With 2 as a primitive element of GF(m+1), $2^i$ mod (m+1) can be any value between 1 and m, and therefore, any element $\alpha^0+\alpha^0$ can be written as $(\alpha^1+\alpha^0)^t$ where t is $2^n$ for some value of $0 \leq n \leq m$. The inverse of $(\alpha^1+\alpha^0)^t$ is: $[(\alpha^1+\alpha^0)^t]^{-1}=[\alpha^1+\alpha^0]^{t*(-1)}=\delta^t$ or $$(\alpha^{m-1})^t + \ldots + (\alpha^3)^t + (\alpha^1)^t$$

where the exponents are modulo m+1. Using (m+1)-bit symbols, raising $\delta$ to a power of 2 is performed as a permutation of the bits of the (m+1)-bit symbol. The coefficient of the $i^{th}$ bit, that is, $x^i$, of $\delta$ raised to the power $t=2^n$ is $x^{(2^{n}*i) \bmod m+1}$.

To determine the inverse of any weight two element $A=\alpha^h+\alpha^v$ where h<v, the system uses $\sigma=\alpha^0+\alpha^{v-h}$ with $\alpha^{h}*\sigma=A$. The inverse of $\sigma$ is then:

$$\sigma^{-1}=[\alpha^0+\alpha^{v-h}]^{-1}$$

or $$\delta^{v-h}=\alpha^{1*(v-h)}+\alpha^{3*(v-h)}\ldots+\alpha^{(m-3)*(v-h)}+\alpha^{(m-1)*(v-h)}$$

and $$A^{-1}=(\alpha^h*\sigma)^{-1}=(\alpha^h)^{-1}*\sigma^{-1}$$

The element $\alpha^h$ has weight 1, and thus $$A^{-1}=(\alpha^{m+1-h})*\delta^{v-h}.$$

The quantity $\delta^{v-h}$ is calculated as a permutation, and the product is a cyclic shift of the permuted bits by (m+1-h)-bits to the left.

As an example with m=4 and A=10100 or $\alpha^2+\alpha^4$, with h=2 and v=4

$$\sigma=\alpha^0+\alpha^{(4-2)}=\alpha^0+\alpha^2$$

and $$\sigma^{-1}=\delta^2$$

or $$\alpha^{1*2}+\alpha^{3*2}=\alpha^2+\alpha^{6(\bmod 5)}=\alpha^2+\alpha^1$$

and $$A^{-1}=(\alpha^{5-2})*(\alpha^2+\alpha^1)=\alpha^3*(\alpha^2+\alpha^1)=$$
$$\alpha^0+\alpha^4=1001$$

To check that this is a multiplicative inverse:

$$A*A^{-1}=10100*10001=10100+01010=11110=00001$$

For elements of weight 3, the system uses an (m−1)-element look-up table of the inverses of elements of the form 000 . . . 000111, 000 . . . 001011, 000 . . . 010011, and so forth. To find the inverse of any weight three element A, where $A=\alpha^a+\alpha^b+\alpha^c$ and a>b>c, the system first multiplies A by $\alpha^{-c}$, that is, $\alpha^{(m+1-c)}$, to form $$A*\alpha^{-c}=\alpha^{a'}+\alpha^{b'}+1=\gamma$$

where a'=a−c and b'=b−c. This is the same as:

$$\gamma=(\alpha^{a''}+\alpha^1+1)^{b'}$$

where a''*b'=a' or $$a''=\frac{a'}{b'} \pmod{m+1}.$$

Next, the inverse of $\alpha^{a''}+\alpha^1+1$ is retrieved from the look-up table. The inverse is an element D, and the inverse of $\gamma$ is $D^{b'}$. The inverse of A is then:

$$\alpha^c*D^{b'}=$$
$$\alpha^c*D^{b-c}$$

where $D^{b-c}$ is calculated as a permutation and multiplication by $\alpha^c$ is a cyclic shift.

3. The System

Figure 6:
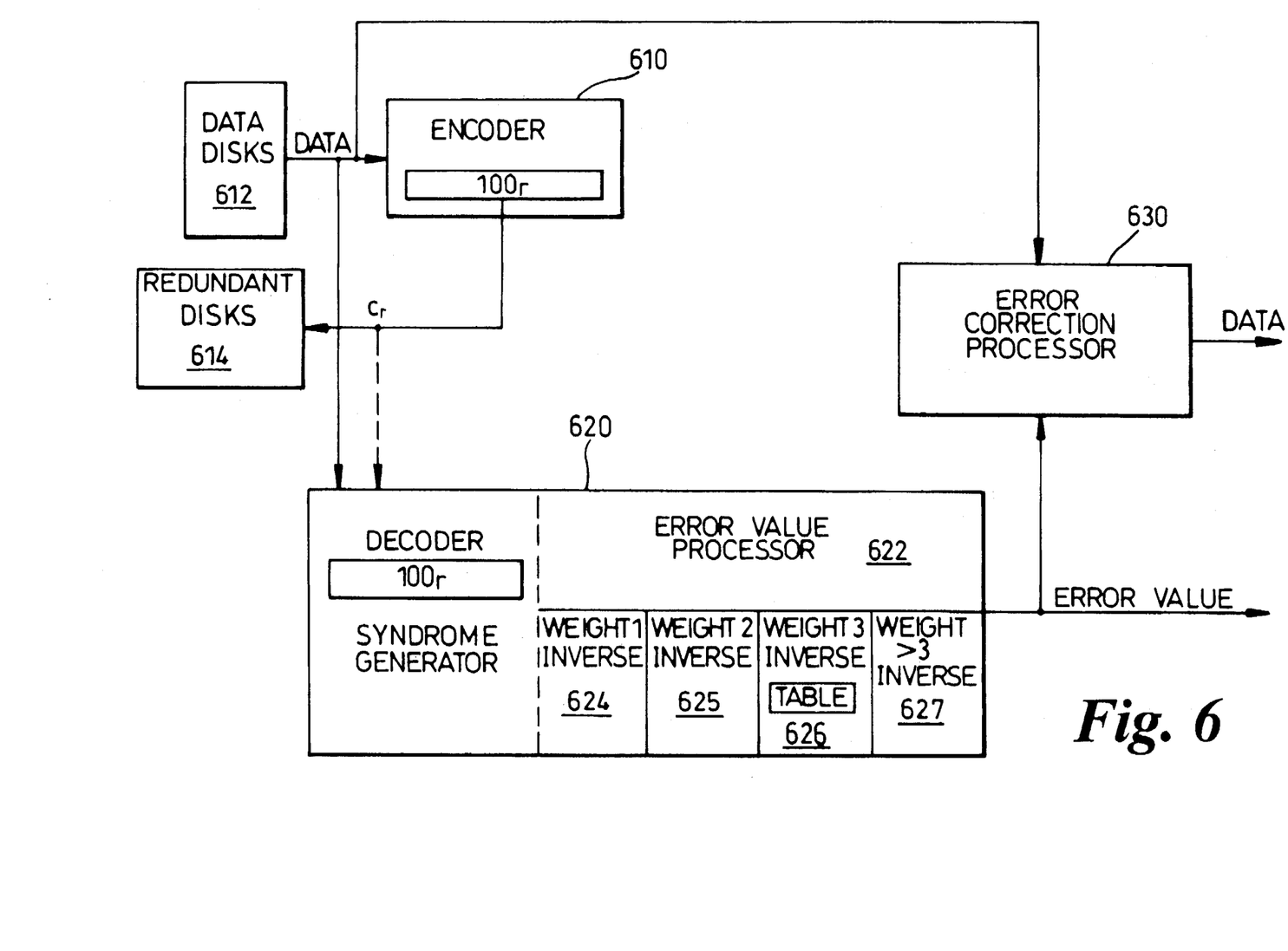
FIG. 6 is a functional block diagram of an encoding/decoding system that incorporates the circuits of FIGS. 2–5.

Referring now to FIG. 6, an encoder 610 encodes corresponding sectors from k data disks 612 to produce r redundancy sectors for recording on r redundancy disks 614. The encoder uses the circuits 100$_r$ discussed above with reference to FIGS. 2–5, to produce the redundancy symbols $c_0$, $c_1, \ldots, c_{r-1}$.

A decoder 620 and error correction processor 630 correct errors in the data stored on the k data disks. The errors are detected in a conventional manner, using the ECC symbols stored on the data disks.

The decoder 620 decodes down a column, using (m+1)-bit representations of the error-free m-bit sectors, and m+1 zeros for the erroneous sectors. The erroneous sectors are thus not read for the column decoding. If there are q erroneous sectors, where q may include one or more of the redundant sectors, the system solves a set of q linear equations to recover the erroneous information.

The decoder uses the circuits $100_r$ to reproduce the redundancy symbols $c_r$ as $c'_r$, with $$c'_r = i'_0 + (\alpha^{j^*1})i'_1 + \ldots + \alpha^{j^*k-1}i'_{k-1}$$

where $i'_i$ for any $i=0, 1, \ldots k-1$, is the non-erroneous data read from the $i^{th}$ data disk or all zero if the data contains errors. The decoder, in a conventional manner in a syndrome generator 621, produces syndromes $S_j$, $j=0, 1 \ldots r-1$, that correspond to the non-erroneous redundancy disks.

To correct a single error, the syndrome is:

$$S_j = (\alpha^j)^{p*}i'p$$

where $i'_p$ is the error pattern associated with the $p^{th}$ disk. The error value is recovered by the error value processor 622, which solves $$i'_p = S_j * (\alpha^{jp})^{-1}$$

Since $\alpha^j$ has weight one, $\alpha^{jp}$ has weight one and $(\alpha^{jp})^{-1}$ is $(\alpha^{m+1-jp})$, as discussed above. The processor thus readily determines the multiplicative inverse using the weight 1 subprocessor 624 and multiplies the inverse by $S_j$ as a cyclic shift.

To correct double errors, the syndromes are:

$$S_j = (\alpha^j)^{p*}i'_p + (\alpha^j)^q i'_q$$

$$S_{j+1} = (\alpha^{j+1})^{p*}i'_p + (\alpha^{j+1})^q i'_q$$

where $i'_q$ is the error pattern associated with the $q^{th}$ disk. The error values are then determined as:

$$i'_p = \frac{(s_j*(\alpha^{j+1})^q) + (s_{j+1}*(\alpha^j)^q)}{[(\alpha^j)^p*(\alpha^{j+1})^q] + [(\alpha^{j+1})^p*(\alpha^j)^q]}$$

$$i'_q = \frac{(s_j*(\alpha^{j+1})^p) + (s_{j+1}*(\alpha^j)^p)}{[(\alpha^j)^p*(\alpha^{j+1})^q] + [(\alpha^{j+1})^p*(\alpha^j)^q]}$$

The denominator is the sum of two products of powers of $\alpha$, that is, $\alpha^a + \alpha^b$. The sum has weight 0 if $a=b$ and weight two if $a \neq b$. For denominators of weight two, the inverse of $\alpha^a + \alpha^b$ can be readily determined as discussed above by the weight 2 subprocessor 625.

To correct more than two errors the system uses the syndromes that correspond to consecutive redundant disks. To solve the set of equations, the system determines the inverse of the determinant $$D = \begin{vmatrix} \alpha^{j*e_0} & \alpha^{j*e_1} & \ldots & \alpha^{j*e_z} \\ \alpha^{(j+1)*e_0} & \alpha^{(j+1)*e_1} & \ldots & \alpha^{(j+1)*e_z} \\ \vdots & & & \\ \alpha^{(j+z)*e_0} & \alpha^{(j+z)*e_1} & \ldots & \alpha^{(j+z)*e_z} \end{vmatrix}$$

or $$D = J * \begin{vmatrix} 1 & 1 & \ldots & 1 \\ \alpha^{e_0} & \alpha^{e_1} & \ldots & \alpha^{e_z} \\ \vdots & & & \\ \alpha^{z*e_0} & \alpha^{z*e_1} & \ldots & \alpha^{z*e_z} \end{vmatrix} = JV$$

where $J = [(\alpha^{j*e_0})*(\alpha^{j*e_1})* \ldots * (\alpha^{j*e_z})]$ and V is the well-known Vandermonde determinant.

The value of the Vandermonde determinant is equal to the product of the terms $(\alpha^{e_a} + \alpha^{e_b})$ for all $e_0 \leq a \leq e_{z-1}$ and $e_1 \leq b \leq e_z$. Thus, the value of the determinant D is the inverse of $$J*(\alpha^{e_0} + \alpha^{e_1})*(\alpha^{e_0} + \alpha^{e_2})* \ldots *(\alpha^{e_{z-1}} + \alpha^{e_z})$$

which is the product of inverses of the factors.

The factor J is a product of a succession of powers of alpha with weight one, and J is thus a power of alpha with weight one. The inverse of J can be readily determined as $\alpha^{m+1-J}$. The factors of the Vandernonde determinant are each of weight two, and their inverses are readily determined as discussed above by the weight 2 subprocessor 625.

The determinant JV is the denominator used to solve for the error values, which are determined by:

$$\frac{Det_j}{JV}$$

where $Det_j$ is the determinant D with the $j^{th}$ column replaced by the appropriate syndromes. The $Det_j$ is thus equal to the sum of the terms $$(\alpha^a + \alpha^b)*s_j$$

with each product calculated as the sum of two cyclically shifted versions of $S_j$.

If there is not a sufficient number of consecutive, error-free redundant disks to produce z consecutive syndromes, the determinant in the denominator is not a Vandermonde determinant. The factors produced may thus have weights greater than two. For factors with weight three, a weight 3 subprocessor 626 determines the inverse as described above. For terms with weights greater than 3, a weight >3 subprocessor 627 uses the Euclidean Algorithm to iteratively solve $a(x)*b(x)+q(x)*(x^m+x^{m+1}+ \ldots +x+1)$, where $b(x)$ is the inverse.

The system may instead use a non-primitive Reed-Solomon code for the column ECC, and the column encoder and decoder may then share hardware, as discussed in a paper by Fettweis and Hassner entitled, "A Combined Reed-Solomon Encoder and Syndrome Generator With Small Hardware Complexity," *Proceeding of the* 1992 *IEEE International Symposium On Circuits and Systems*, San Diego, Calif., May 10–13 1993, pp. 1871–1874, which is incorporated herein by reference. For example, the encoders and decoders may share multipliers, shift registers and adders. If a non-primitive Reed-Solomon code is used, there is a maximum of m total disks, that is, $k+r \leq m$.

A non-primitive Reed-Solomon code has a generator polynomial $$g(x) = (x+\alpha^0)(x+\alpha^1) \ldots (x+\alpha^t)$$

which has t+1 consecutive roots. With the non-primitive Reed-Solomon code, the syndromes are determined based on the retrieved symbols from all of the disks, not just the data disks. Thus the syndromes are:

$$S_j = i'_0 + (\alpha^{j*1})i'_1 + \ldots + (\alpha^{j*k+r-2})i'_{k+r-2}(\alpha^{j*k+r-1})i_{k+r-1}$$

For $j=0, 1, \ldots, t$.

For any number of errors $z \leq r$ there are always r consecutive syndromes available. Indeed, the first z syndromes may be used. The determinant for which an inverse is required to solve for the error values is thus the Vandermonde determinant. Accordingly, as discussed above, the inverse of the determinant is readily found by multiplying together the inverses of the factors $\alpha^a+\alpha^b$, each of which has weight two. The calculations for determining the error values are esentially the same for any number of errors. Accordingly, the system may readily correct up to r errors, without having to find the inverse of any element with weight greater than two.

The system described above encodes columns of m-bit symbols as (m+1)-symbols, where m can be selected to be as large as or larger than the number of bits in a disk sector or a tape block. With known prior systems for column encoding, the use of such large m-bit symbols is essentially prohibited by the complexity of the required Galois field multipliers and circuits for finding multiplicative inverses in $GF(2^m)$. The current system simplifies these operations and can thus use essentially arbitrarily large values of m. As discussed above, the value of m is selected from the table of FIG. 1, which may be extended to include larger values for m, as necessary.

The foregoing description has been limited to a specific embodiment of this invention. It will be apparent, however, that variations and modifications, such as the use of various configurations of shift registers to perform the cyclic shifting operations, the performing of various operations in software, hardware or firmware, or the combining of various single-purpose processors into one or more multi-purpose processors, may be made to the invention, with the attainment of some or all of its advantages. Therefore, it is the object of the appended claims to cover all such variations and modifications as come within the true spirit and scope of the invention.

What is claimed is:

1. A system for encoding m-bit data symbols from k data disks to produce m-bit redundant symbols for r redundant disks by encoding corresponding symbols from each of the k data disks, the system including:

A. means for receiving data from corresponding sectors of the k data disks;
   B. encoding means for producing (m+1)-bit redundant symbols as $$c_y = \alpha^{y^n(k-1)} i_{k-1} + \alpha^{y^n(k-2)} i_{k-2} + \ldots + \alpha^{y^n(1)} i_1 + i_0$$

for y=0, 1, ... r−1 where $j_j$ is the data from the $j^{th}$ data disk, and $\alpha$ is an (m+1)-bit representation of an element of $GF(2^m)$, with m+1 prime, said means including for each $c_y$:
   i. a shift register for performing the multiplication operations as y-bit cyclic shifts, and
   ii. an adder for adding to the contents of the shift register the corresponding data from a next data disk;
   C. converting means for converting the (m+1)-bit redundant symbols to m-bit redundant symbols; and
   D. means for storing the m-bit redundant symbols in corresponding sectors of the r redundant disks.

2. The system of claim 1 wherein the encoding means encodes m-bit sectors.

3. The system of claim 1 wherein the shift register is an (m+1)-bit shift register that includes a feedback path that in a single shift produces the results of a y-bit cyclic shift.

4. A system for encoding m-bit data symbols from k tracks of a (k+r)-track tape to produce m-bit redundant symbols for r redundant tracks by encoding corresponding symbols from each of the k data tracks, the system including:

A. means for receiving data from corresponding blocks of the k data tracks;
   B. encoding means for producing (m+1)-bit redundant symbols as $$c_y = \alpha^{y^n(k-1)} i_{k-1} + \alpha^{y^n(k-2)} i_{k-2} + \ldots + \alpha^{y^n(1)} i_1 + i_0$$

for y=0, 1, ... r−1 where $i_j$ is the data from the $j^{th}$ data track, and $\alpha$ is an (m+1)-bit representation of an element of $GF(2^m)$, with m+1 prime, said means including for each $C_y$:
   i. a shift register for performing the multiplication operations as y-bit cyclic shifts, and
   ii. an adder for adding to the contents of the shift register the corresponding data from a next data track;
   C. converting means for converting the (m+1)-bit redundant symbols to m-bit redundant symbols; and
   D. means for storing the m-bit redundant symbols in corresponding blocks of the r redundant tracks.

5. The system of claim 4 wherein the encoding means encodes m-bit blocks.

6. The system of claim 4 wherein the shift register is an (m+1)-bit shift register that includes a feedback path that in a single shift produces the results of a y-bit cyclic shift.

7. A decoder for correcting errors in corresponding sectors of k data disks using redundant symbols that are stored lorresponding sectors on r redundant disks, the decoder including:

A. means for receiving data from the k data disks;
   B. decoding means for producing (m+1)-bit redundant symbols as $$c_y \alpha^{y^n(k-1)} i_{k-1} + \alpha^{y^n(k-2)} i_{k-2} + \ldots + \alpha^{y^n(1)} i_1 + i_0$$

for y=0, 1, ... r−1 where $i_j$ is error-free data from the $j^{th}$ data disk or if the data on the $j^{th}$ disk is erroneous all zeros, and $\alpha$ is an (m+1)-bit representation of an element of $GF(2^m)$, with m+1 prime, said means including for each $c_y$:
   i. a shift register for performing the multiplication operations as y-bit cyclic shifts, and
   ii. an adder for adding to the contents of the shift register the data from a next data disk;
   C. a syndrome generator for producing syndromes $S_j$, $S_{j+1}$ ... $S_{j+z-1}$, where z is the number of disks containing erroneous data, the syndrome generator producing $S_j=$ $$(\alpha^j)^{e_0} * i'_{e_0} + (\alpha^j)^{e_1} * i'_{e_1} + \ldots + (\alpha^j)^{e_z} * i'_{e_z}$$

for j=0, 1, ... , r−1, where $i'_{e_z}$ is the error pattern associated with the $z^{th}$ erroneous disk, and $S_j$ is the syndrome associated with the $j^{th}$ redundant disk.
   D. means for determining error values associated with the syndromes, said means including means for determining multiplicative inverses of (m+1)-bit symbols $(\alpha^j)^p$ with weight one as $\alpha^{m+1-jp}$;
   E. converting means for converting the (m+1)-bit error value to an m-bit error value; and
   F. means for correcting the erroneous m-bit symbols using the m-bit error value.

8. The decoder of claim 7 wherein the means for determining error values further includes means for determining multiplicative inverses of $A=\alpha^h+\alpha^v$, an (m+1)-bit symbol with weight-two, as $A^{-1}=(\alpha^{m+1-h})*\delta^{v-h}$, where $\delta$ is $\alpha^{m-1}+\alpha^{m-3}+\ldots+\alpha^3+\alpha^1$.

9. The decoder of claim 8 wherein the means for determining error values also includes means for determining multiplicative inverses of $A=\alpha^a+\alpha^b+\alpha^c$, an (m+1)-bit symbol with weight three, as $\alpha^c*D^{b-c}$, where D is the inverse of $\alpha^{a''}+\alpha+1$ $$a'' = \frac{a-c}{b-c}.$$

10. The decoder of claim 9 wherein the means for determining error values further includes an (m−1)-element table of the multiplicative inverses of weight-three (m+1)-bit symbols of the form ... 1 ... 0011, the means entering the table to determine the symbol D.

11. A decoder for correcting errors in corresponding blocks of k data tracks of a multiple track tape system using redundant symbols that are stored in corresponding blocks on r redundant tracks, the decoder including:

A. means for receiving data from the k data tracks;

B. decoding means for producing (m+1)-bit redundant symbols as $$c_y=\alpha^{y*(k-1)}i_{k-1}+\alpha^{y*(k-2)}i_{k-2}+\ldots+\alpha^{y*(1)}i_1+i_0$$

for y=0, 1, ... r−1 where $i_j$ is error-free data from the $j^{th}$ data track or if the data on the $j^{th}$ track is erroneous all zeros, and $\alpha$ is an (m+1)-bit representation of an element of $GF(2^m)$, with m+1 prime, said means including for each $c_y$:

i. a shift register for performing the multiplication operations as r-bit cyclic shifts, and ii. an adder for adding to the contents of the shift register the data from a next data track;

C. a syndrome generator for producing syndromes $S_j$, $S_{j+1}$ ... $S_{j+z-1}$, where z is the number of tracks containing erroneous data, the syndrome generator producing $S_j=$ $(\alpha^j)^{c0}*i'_{c0}+(\alpha^j)^{c1}*i'_{c1}+\ldots+(\alpha^j)^{cz}*i'_{cz}$ for j=0, 1, ..., r−1, where $i'_{cz}$ is the error pattern associated with the $z^{th}$ erroneous track, and $S_j$ is the syndrome associated with the $j^{th}$ redundant track.

D. means for determining error values associated with the syndromes, said means including means for determining multiplicative inverses of (m+1)-bit symbols $(\alpha^j)^p$ with weight one as $\alpha^{m+1-jp}$;

E. converting means for converting the (m+1)-bit error value to an m-bit error value; and F. means for correcting the erroneous m-bit symbols using the m-bit error value.

12. The decoder of claim 11 wherein the means for determining error values further includes means for determining multiplicative inverses of $A=\alpha^h+\alpha^v$, an (m+1)-bit symbol with weight-two, as $A^{-1}=(\alpha^{m+1-h})*\delta^{v-h}$, where $\delta$ is $\alpha^{m-1}+\alpha^{m-3}+\ldots+\alpha^3+\alpha^1$.

13. The decoder of claim 12 wherein the means for determining error values also includes means for determining multiplicative inverses of $A=\alpha^a+\alpha^b+\alpha^c$, an (m+1)-bit symbol with weight three, as $\alpha^c*D^{b-c}$, where D is the inverse of $\alpha^{a''}+\alpha+1$ and $$a'' = \frac{a-c}{b-c}.$$

14. The decoder of claim 9 wherein the means for determining error values further includes an (m−1)-element table of the multiplicative inverses of weight-three (m+1)-bit symbols of the form ... 1 ... 0011, the means entering the table to determine the symbol D.

* * * * *